United States Patent [19]

Bibeau et al.

[11] 4,273,381
[45] Jun. 16, 1981

[54] DUMP BODY FOR MOUNTING ON THE FRAME OF A VEHICLE

[76] Inventors: Jean-Marie Bibeau, 109 Houle Blvd., St. Gabriel de Brandon; Marcel Bibeau, 4471, Castel d'Autray, St. Felix de Valois, both of Canada

[21] Appl. No.: 955,386

[22] Filed: Oct. 27, 1978

[51] Int. Cl.³ .............................................. B60P 1/00
[52] U.S. Cl. .................................. 298/1 H; 52/814; 296/184
[58] Field of Search ................. 298/1 H, 17 R, 23 R; 296/183, 184, 187; 105/451, 422; 52/36, 801, 814; 220/66, 71

[56] References Cited

U.S. PATENT DOCUMENTS

| | | | |
|---|---|---|---|
| 2,873,008 | 2/1959 | Ashman | 52/801 |
| 3,094,351 | 6/1963 | Gwinn | 296/184 |
| 3,306,654 | 2/1967 | Curcio | 296/184 |
| 3,462,187 | 8/1969 | Hassler | 296/184 |
| 3,472,548 | 10/1969 | Comisac | 298/1 H |
| 3,499,678 | 3/1970 | Richler | 298/1 H |
| 3,897,972 | 8/1975 | Logue | 288/1 H |

FOREIGN PATENT DOCUMENTS

| | | | |
|---|---|---|---|
| 628708 | 6/1963 | Belgium | 105/422 |
| 691163 | 7/1964 | Canada | 296/184 |
| 777265 | 6/1957 | United Kingdom | 298/1 H |
| 249201 | 12/1969 | U.S.S.R. | 298/1 H |
| 286524 | 11/1971 | U.S.S.R. | 298/1 H |

Primary Examiner—Leslie J. Paperner
Assistant Examiner—R. B. Johnson

[57] ABSTRACT

A dump body for mounting on the frame of a vehicle is disclosed. The dump body comprises a floor, side walls and a front wall secured together to form an integral unit, a rear gate closing the back of the unit. The floor is composed of a central, elongated plate and a pair of elongated lateral plates, each of smaller thickness than the central plate, so that the latter will resist abrasion for a longer time, where abrasion is most likely to occur and yet reducing the weight of the dump body. The lateral plates extend underneath and overlap the central plate and are bent to form integral, longitudianally-extending hollow beams welded to the central plate for strengthening the unit.

1 Claim, 4 Drawing Figures

DUMP BODY FOR MOUNTING ON THE FRAME OF A VEHICLE

This invention relates to a dump body for mounting on the frame of trucks or similar vehicles, and more particularly to dump bodies of the all-steel welded integral type.

BACKGROUND OF THE INVENTION

Dump bodies of the integral type are well known. However, the known dump bodies are heavy due mainly to their own heavy substructure or to the additional subframe which is required on the vehicle to support them. Known dump bodies are also heavy because their floors are made of a steel plate of uniform thickness throughout and great enough to have sufficient rigidity and also to resist abrasion during loading and unloading. Furthermore, the known dump bodies are generally formed of sharp corners which retain gravel and dust and must be regularly clean, thus adding to the maintenance cost.

OBJECTS OF THE INVENTION

It is therefore an object of the present invention to provide a dump body of lighter construction permitting to increase payload, having regard to the laws regulating the total load of the vehicle.

It is still another object of the present invention to provide a dump body which has a minimum of sharp corners and so prevent the accumulation of gravel and dirt in such corners to reduce the cleaning cost.

SUMMARY OF THE INVENTION

The dump body in accordance with the invention comprises a floor, side walls and a front wall secured together to form an integral unit, a rear gate closing the back of the unit. The floor comprises an elongated central plate and a pair of elongated lateral plates, each of smaller thickness than said central plate. Each lateral plate has a marginal portion extending underneath and overlapping the central plate and bent to form a generally V-shaped longitudinally-extending beam having the edges of its legs welded to the central plate.

The junction of the front wall and side walls with the floor of the dump body are inclined at an angle of about 45° so as to prevent accumulation of gravel and dust at such junctions.

BRIEF DESCRIPTION OF THE DRAWINGS

The invention will now be disclosed, by way of example, with reference to the accompanying drawings, in which.

Figure 1:
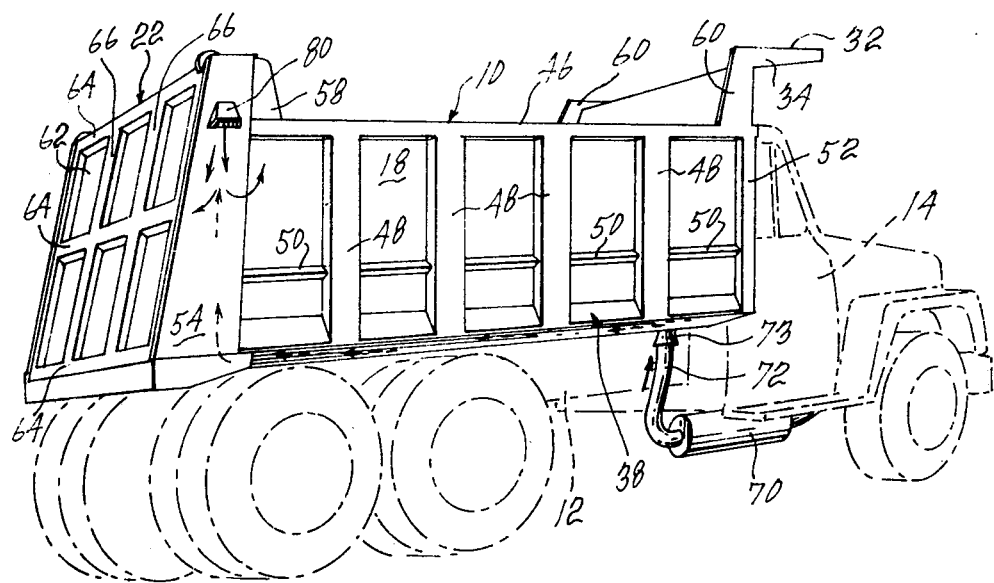
FIG. 1 illustrates a perspective view of a dump body in accordance with the invention.
Figure 2:
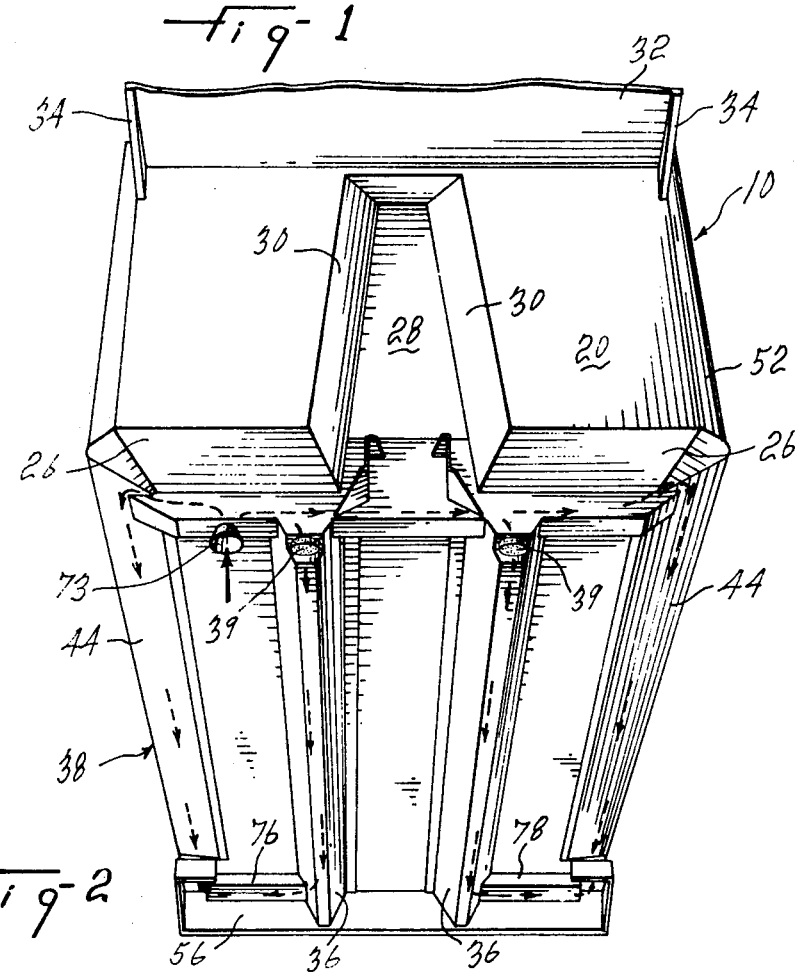
FIG. 2 illustrates a perspective view from below the dump body in accordance with the invention.
Figure 3:
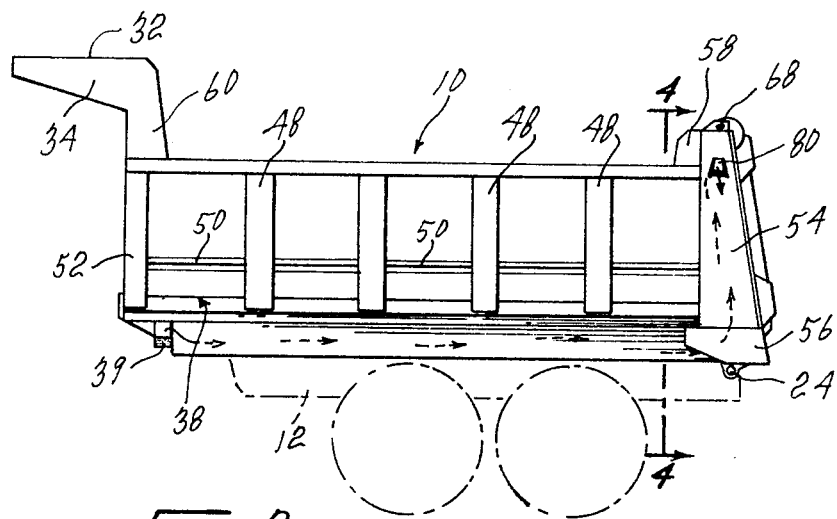
FIG. 3 illustrates a side elevation view or the dump body in accordance with the invention.
Figure 4:
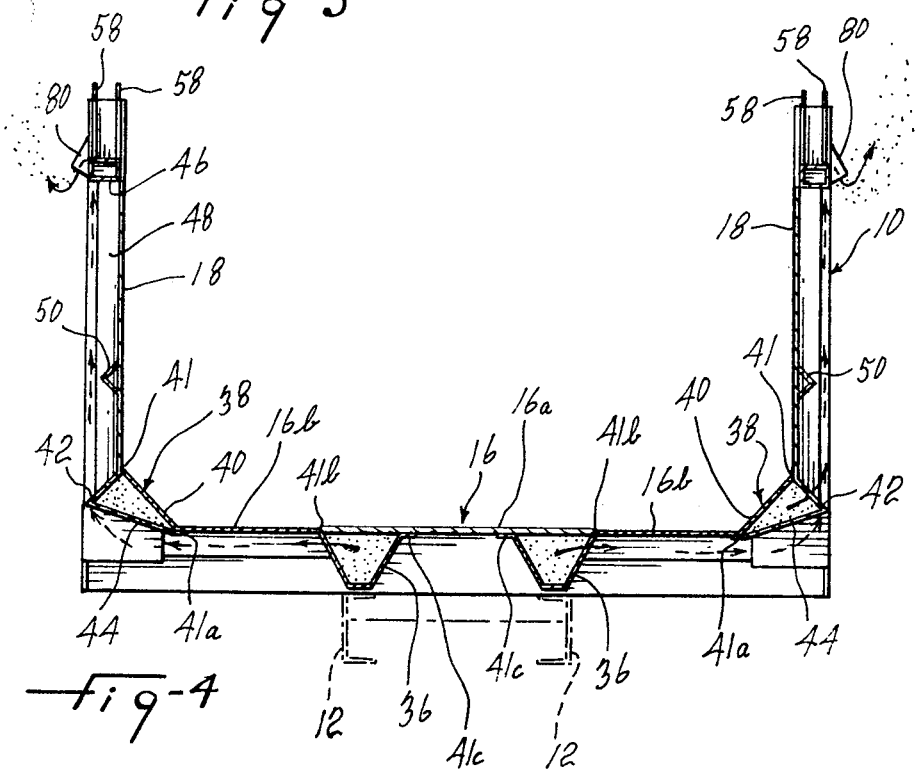
FIG. 4 illustrates a view taken along line 4—4 of FIG. 3.

Referring to the drawings, there is shown a dump body 10 for mounting on the frame 12 of a conventional truck 14. The dump body generally comprises a floor 16, side walls 18 and a front wall 20 secured together to form an integral unit. The unit is closed at the back by a rear gate 22. The dump body is pivotally mounted around pins 24 secured to the back of the frame and can be tilted around such pins, in known manner, by means of a hydraulic jack (not shown) located at the front of the unit.

The front wall 20 of the dump body comprises a main vertical plate which is bent inwardly at its lower end by an angle of about 45° to form an inclined plane 26 which is welded to the floor 16. The configuration thus obtained provides higher resistance to the shear forces exerted at the level of the joints where the two plates meet. The front wall is also provided with a central, upwardly extending recess 28 opening downwardly and having inclined walls 30 to lodge the hydraulic jack and the auxiliary equipment (not shown) for lifting the front of the dump body. The inclined walls 30 of such recess also contribute to increase the resistance of the front wall to the load carried by the dump body. The recess also permits to reduce the space between the front wall of the dump body and the cabin of the truck, thus increasing the carrying capacity of the dump body. The inclined walls 30, which converge both upwardly and rearwardly of the dump body, avoid sharp reentrant corners inside the dump body, therefore preventing entrapment of material during and after dumping. A cab-guard 32 is secured to the upper end of front wall 18 to protect the cabin of the truck. The cab-guard is supported by a pair of brackets 34 which also increase the rigidity of the front wall of the dump body.

The floor 16 of the dump body is reinforced by means of longitudinal hollow beams 36, of generally V-shape in cross-section and adapted to rest directly on the supporting truck beams 12. Additional longitudinal hollow beams 38 are also provided at the junction of the floor 15 with each side wall 18 to reinforce the dump body. The hollow beams 38 are triangular in shape and formed of three elongated plate sections 40, 42, and 44 which define a hollow space therebetween. In accordance with the main feature of the present invention, floor 16 comprises a separate central section 16a and each hollow beam 36 is formed from a plate which has a lateral integral extension defining a lateral floor section 16b, itself laterally extended by the inclined plate section 40 integral with the same plate. Central floor section 16a is made of a thicker plate material than lateral floor sections 16b and inclined plate sections 40 toresist abrasion from the load for a longer time while keeping to a minimum the overall weight of the dump body. It should be noted that abrasion occurs not only during unloading but also when the dump body is being loaded, since the material falls from a level above the side walls 10. Most of the material normally falls directly on the central floor portion 16a. Plate sections 42 and 44 are preferably integral extensions of the respective side walls 18, resulting in maximum strength of the reinforcing beams 38. The various elongated plates forming the side walls, floor and hollow beams are longitudinally welded at 41, 41a, 41b, and 41c, namely at the lower free edge of section 40, section 44, central floor section 16, and beam 36 respectively. Preferably, rubber bumpers 39 are fixed in a recess at the front end of each beam 36 to contact truck beams 12 and absorb the shock when the dump body is lowered on beams 12.

Each side wall 18 is reinforced by an upper longitudinal tubular member 46 and by regularly spaced vertical hollow posts 48 joining the tubular member 46 and the hollow beam 38. Transverse V-shaped corrugations 50 may also be provided in the side walls themselves to reinforce the side walls of the dump body. The side walls 18 are joined to the front wall 20 by means of a hollow post 52 which is welded to tubular member 46 at its upper end and bent at its lower end to correspond to the angular deflection of plates 26 and 44. The side walls are reinforced at the back by two hollow posts 54 which are welded to the side walls and to a rear plate 56, itself welded to the end of the hollow beams 36 and 38. Two spaced brackets 58 are secured to longitudinal tubular member 46 and to rear post 54 and two similar spaced brackets 60 are secured to longitudinal tubular member 46 and cab-guard 32. Boards may be inserted in the space between brackets 58 and 60 to raise the height of the side walls and so increase the loading capacity, when needed.

The rear gate 22 is formed of a main plate 62, upon which are secured horizontal reinforcing members 64 and vertical reinforcing members 66. The rear gate is hinged at the top of posts 54 through pins 68 in known manner.

What we claim is:

1. A dump body for mounting on the frame of a truck comprising:
    (a) a floor, side walls and a front wall secured together to form an integral unit;
    (b) a rear gate closing the back of the unit; and
    (c) wherein the floor comprises an elongated central plate forming a central, flat floor section, and a pair of elongated lateral plates, each of smaller thickness than said central plate, each lateral plate forming a lateral floor section co-planar with said central floor section and the inner marginal portion of each lateral plate adjacent said central plate being overlapped by said central plate and bent to form a generally V-shaped longitudinally-extending beam having the edges of its legs welded to the underside of said central plate, each of said beams resting directly on the frame of the truck to fully support the dump body, each lateral plate having an outer marginal portion which has its free edge welded to a respective side wall, said outer marginal portion inclined upwardly at an angle of about 45 degrees relative to said floor to form an inclined surface at the junction of the floor with the side wall and prevent accumulation of dust and gravel at said junction, said outer marginal portion overlying the lower portion of said side wall, said lower portion bent to form two mutually-inclined plate sections constituting with said inclined outer marginal portion a reinforcing hollow beam at the junction of the floor with one side wall, the free edge of said lower portion of said side wall being welded to said lateral floor section.

* * * * *